United States Patent
Karr et al.

(10) Patent No.: US 7,389,393 B1
(45) Date of Patent: Jun. 17, 2008

(54) SYSTEM AND METHOD FOR WRITE FORWARDING IN A STORAGE ENVIRONMENT EMPLOYING DISTRIBUTED VIRTUALIZATION

(75) Inventors: Ronald S. Karr, Sunnyvale, CA (US); Dhanesh V. Joshi, Santa Clara, CA (US); Narasimha R. Valiveti, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 568 days.

(21) Appl. No.: 10/970,584

(22) Filed: Oct. 21, 2004

(51) Int. Cl.
  *G06F 12/00* (2006.01)
(52) U.S. Cl. .......................... 711/156; 711/103
(58) Field of Classification Search .................. None
  See application file for complete search history.

(56) References Cited

U.S. PATENT DOCUMENTS

| | | | |
|---|---|---|---|
| 6,816,917 B2 | 11/2004 | Dicorpo et al. | |
| 6,845,403 B2 | 1/2005 | Chadalapaka | |
| 6,857,059 B2 | 2/2005 | Karpoff et al. | |
| 6,877,011 B2 | 4/2005 | Jaskiewicz | |
| 6,898,670 B2 | 5/2005 | Nahum | |
| 2002/0156987 A1 | 10/2002 | Gajjar et al. | |
| 2005/0193245 A1* | 9/2005 | Hayden et al. | 714/13 |

* cited by examiner

*Primary Examiner*—Alford Kindred
*Assistant Examiner*—Horace L. Flournoy
(74) *Attorney, Agent, or Firm*—Meyertons Hood Kivlin Kowert & Goetzel, P.C.

(57) ABSTRACT

A system for write forwarding in a storage environment employing distributed virtualization includes a first and a second storage server providing access to a first and a second physical storage device, respectively, a virtual device server and a virtual device client. The virtual device server may be configured to aggregate storage in the first and second physical storage device into a virtual storage device and make the virtual storage device accessible to the virtual device client for I/O operations. An update requested by the virtual device client may require a first physical write operation at the first physical storage device and a second physical write operation at the second physical device. The virtual device client may be configured to send an update request to the first storage server, rather than to both the first and the second storage servers. The first storage server may respond to the update request by starting the first physical write operation, and forwarding a request for the second physical write operation to the second storage server.

27 Claims, 12 Drawing Sheets

SYSTEM AND METHOD FOR WRITE FORWARDING IN A STORAGE ENVIRONMENT EMPLOYING DISTRIBUTED VIRTUALIZATION

BACKGROUND OF THE INVENTION

1. Field of the Invention

This invention relates to computer systems and, more particularly, to the management of updates within storage environments employing distributed virtualization techniques.

2. Description of the Related Art

Many business organizations and governmental entities rely upon applications that access large amounts of data, often exceeding a terabyte or more of data, for mission-critical applications. Often such data is stored on many different storage devices, which may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software.

Some of the added storage features, such as data mirroring, may require more than one physical write operation to be performed for a given logical update. For example, if a data file is stored on a mirrored storage device including two mirrored physical disks, an update to the data file by an application at a client computer system may require a physical write operation at each of the mirrored physical disks. In a distributed storage environment, each of the two mirrored disks may be hosted at a different storage server, to which the client computer system may be connected via a network. For each logical update by the application, one request for a physical write may be sent from the client computer system over the network to each storage server, and one acknowledgment may be received at the client computer system from each storage server. In an update-intensive storage environment with a large number of client applications, outbound network paths between clients and storage servers may become heavily utilized, leading to overall reduced performance for update operations. In such environments, it may be desirable to reduce the number of write requests required to be sent from client computer systems for a given logical update.

SUMMARY OF THE INVENTION

Various embodiments of a system and method for write forwarding in a storage environment employing distributed virtualization are disclosed. According to a first embodiment, a system may include a first and a second storage server providing access to a first and a second physical storage device, respectively, a virtual device server and a virtual device client. The virtual device server may be configured to aggregate storage in the first and second physical storage device into a virtual storage device and make the virtual storage device accessible to the virtual device client for I/O operations. An update of data at the virtual storage device requested by the virtual device client may require a first physical write operation at the first physical storage device and a second physical write operation at the second physical device: for example, the virtual storage device may be mirrored across the first and second physical storage devices.

The virtual device client may be configured to send an update request to the first storage server, rather than to both the first and the second storage servers. The first storage server may respond to the update request by starting the first physical write operation (e.g., on a first mirror of a mirrored virtual storage device), and may forward a request for the second physical write operation to the second storage server. The second storage server may then respond to the forwarded request by performing the second physical write operation (e.g., at a second mirror), and may send a message indicating that the second physical write operation has completed to the first storage server. Upon completing the first physical write operation and receiving the message indicating a completion of the second physical write operation, the first storage server may send a message indicating a completion of the requested update to the virtual device client. By forwarding the request for the second physical write operation from the first storage server to the second storage server, instead of relying upon the virtual device client to send write requests directly to each storage server, a reduction in network congestion on outgoing network paths from the virtual device client may be achieved.

In one specific embodiment, the virtual storage device may be a block storage device such as a mirrored logical volume or a virtual distributed RAID device, which may include additional physical storage devices beyond the first and second physical storage devices. In another specific embodiment, the virtual storage device may be a virtual object device (e.g., a device that provides files or other higher-level objects as the basic storage primitives accessible to storage clients).

Several other embodiments are also disclosed. According to one embodiment, a specific storage server may be selected (and may be designated as an update coordinator) to handle all update requests targeted at a given virtual storage device such as a logical volume. Various storage accessors such as virtual device clients, virtual device servers, and storage servers other than the update coordinator may all be configured to send update requests for the virtual storage device to the update coordinator. The update coordinator may be configured to arrange concurrent overlapping update requests (i.e., more than one concurrent request to update the same block of data) in an order than preserves data consistency of the virtual storage device. For example, an update coordinator may provide an interlocking mechanism that may ensure that the various mirrors of a mirrored logical volume remain consistent with each other under a workload including concurrent updates to the same data block (e.g., when a mirror resynchronization operation on a given data block may be requested in close time proximity to an update of the same data block requested by another client application).

According to another embodiment, a virtual address space of a virtual storage device may be partitioned into two or more address partitions, and a different storage server may be designated as an update coordinator for each address partition. The virtual device server may be configured to provide a mapping between the virtual address space and the update coordinators to virtual device clients. A virtual device client may be configured to use the mapping to select a target update coordinator for a given update based upon the virtual storage address affected by the update. An update request for data stored within a given address partition may be sent by the virtual device client to the corresponding target update coordinator. The target update coordinator may perform a first local physical write at a physical storage device in response to the update request, and may forward write requests to other update coordinators (i.e., other storage servers) as needed.

Figure 1:
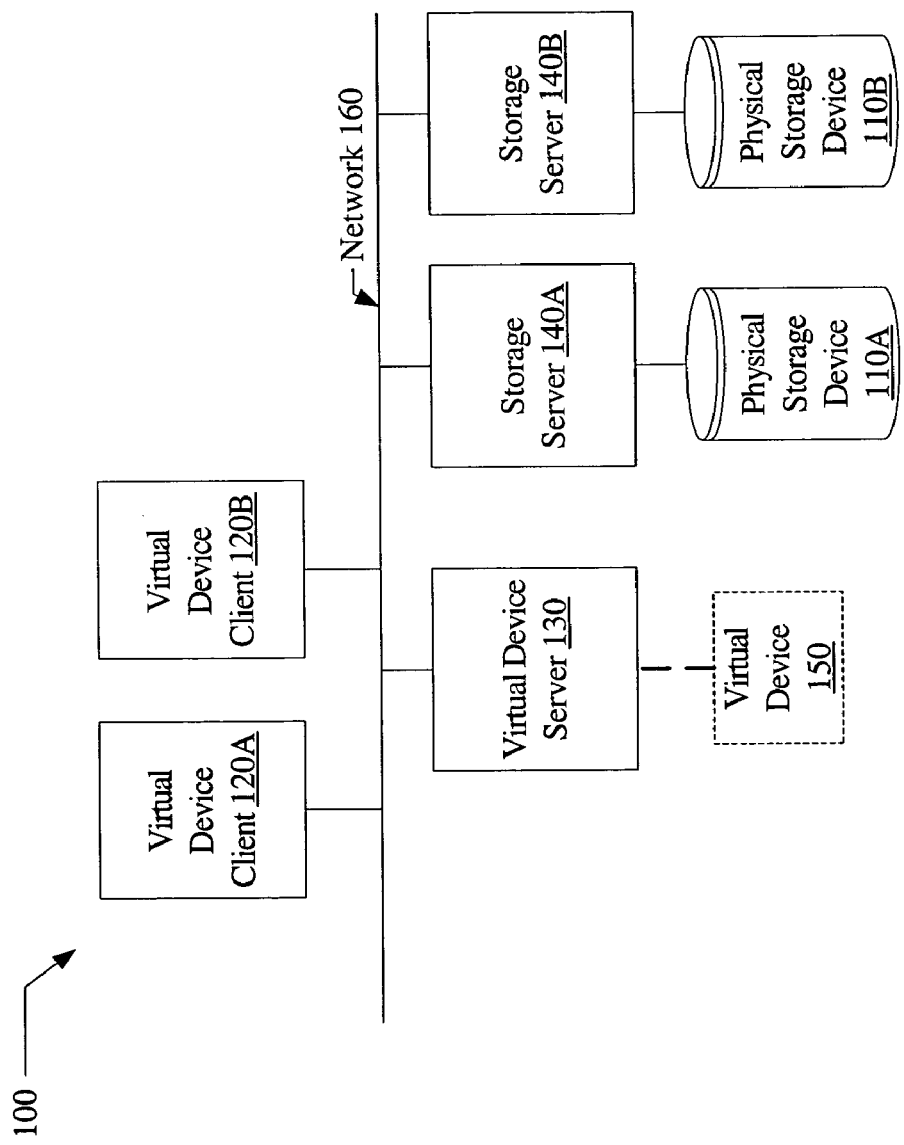
FIG. 1 is a block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a storage system 100 according to one embodiment. In the illustrated embodiment, system 100 includes storage servers 140A and 140B (which may be collectively referred to herein as storage servers 140), a virtual device server 130, and virtual device clients 120A and 120B (collectively, volume clients 120) coupled to network 160. Storage server 140A and 140B may provide access to physical storage device 110A and physical storage device 110B, respectively, to virtual device server 130 and volume clients 120. Virtual device server 130 may be configured to aggregate storage in physical storage devices 110 (i.e., 110A-B) into a virtual device 150 and present virtual device 150 to volume clients 120 and storage servers 140.

Figure 2:
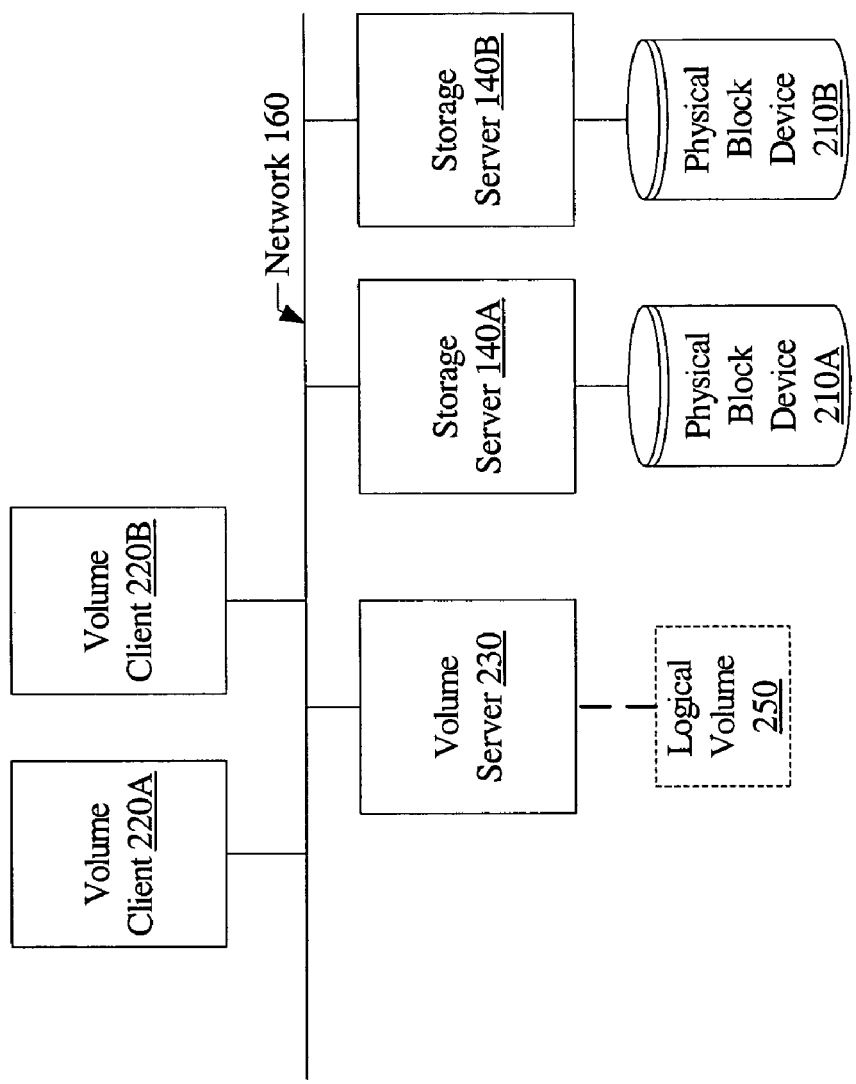
FIG. 2 is a block diagram illustrating one embodiment of a storage system employing block virtualization.

Virtual device server 130 may present virtual storage device 150 using a variety of virtualization primitives in different embodiments, such as virtual blocks or virtual objects such as files, as described in more detail below. In one embodiment, block-based virtualization may be employed, as illustrated in FIG. 2. As shown, physical storage devices may be physical block devices 210, and virtual device server may be a volume server 230 configured to aggregate storage at physical block devices 210 into a logical volume 250 (which may also be referred to herein as a volume). Virtual device clients may be termed volume clients 220 in such an embodiment.

Generally speaking, a block device may comprise any hardware or software entity that provides a collection of linearly addressed data blocks that can be read or written. For example, in one embodiment a physical block device 210 may be a single disk drive configured to present all of its sectors as an indexed array of blocks. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. In some embodiments, a block device may also be a logical or virtual storage device resulting from a mapping of blocks of one or more physical storage devices, as described in greater detail below.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device may read or write blocks directly to the device, bypassing any file system that may be in use. In some embodiments, a block device 210 presented by an operating system for use by a consumer may present relatively few primitives through which the device may be manipulated. For example, in one embodiment a block device 210 may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices 210 that are physical storage devices, such as disks or tape drives, may be configured to present some form of SCSI interface, though other interfaces are possible and contemplated.

Access to one or more physical block devices 210 may be provided by a storage server 140. In some embodiments, one or more physical block devices 210, such as disk arrays and/or individual disks, may be physically hosted at a storage server 140. In other embodiments, a storage server may be physically separated (e.g., in a different physical enclosure) from the physical block devices 210 to which it provides access. In some embodiments, a storage server may temporarily store updated data blocks within a write cache (such as a non-volatile writeback cache) prior to writing the data to an underlying physical block device 210. In such embodiments, an indication of a successful write operation may be sent by a storage server 140 to a requesting storage accessor such as a volume client 220 as soon as the updated data is written to the write cache.

In some embodiments, storage servers 140 may participate in a security protocol to prevent unauthorized access to storage devices; e.g., each storage server 140 may be provided with a list of volume clients and volume servers authorized to access subsets of specific physical storage devices 210 managed at the storage server 140. As described below in further detail, a volume server 230 may provide a given storage server 140A with configuration information on volume 250, which may include, for example, security-related information as well as a layout of volume 250 on physical block devices 210, some of which may be hosted at other storage servers, such as storage server 140B.

In one embodiment, a storage server 140 may be configured to implement an advanced block I/O interface optimized to service requests from volume servers 230 and volume clients 220. That is, authorized volume servers and volume clients may communicate with storage server 140 over network 160 using an advanced storage access protocol that may differ from more traditional interfaces (such as variants of SCSI or iSCSI). The advanced storage access protocol may support features, such as access security and tagged directives for distributed I/O operations, that may not be adequately supported by the traditional interfaces alone. In such an embodiment, storage server 140 may translate data access requests from the advanced storage protocol to a lower level protocol or interface (such as SCSI) that may be presented by the physical block devices 210 managed at storage server 140. While the advanced storage access protocol may provide enhanced functionality, it may still allow block-level access to physical block devices 210. E.g., volume clients 220 and volume server 230 may still access a block of physical block device 210 without requiring the use of a file system.

Generally speaking, a volume 250 may comprise a block device that may be presented directly for use by a block device consumer, e.g., a volume client 220. In one embodiment, a volume client 220 may be a file system or an application (such as a database application, for example) that can directly use block devices. As described in greater detail below, in some embodiments employing block device virtualization, a given volume 250 may be associated with several logical or physical block devices. In such embodiments, each block device included in the logical organization of a given volume or virtualized block device may be referred to as a storage object or logical storage object.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. In embodiments employing block virtualization, such a disk driver may be generally unaware of block virtualization and may in some instances present a barrier to using some virtualization techniques, whereas a volume implementing various block virtualization features may be directly accessible by a consumer without the issues presented by such disk drivers.

A volume manager, such as volume server 230, may introduce virtualization of blocks, creating some number of virtualized block devices out of one or more physical or logical block devices. (In some embodiments, devices such as disk arrays and virtualization switches may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices, replication (which may be synchronous or asynchronous), and point-in-time snapshots. Block virtualization may provide any or all of these capabilities in a fashion transparent to virtualized block device consumers. That is, virtualized block devices may appear as generic storage devices to consumers such as file systems and applications.

Volume server 230 may provide functions such as configuration management of virtualized block devices and distributed coordination of block device virtualization. For example, in one embodiment volume server 230 may be aware of the type and quantity of physical storage devices, such as physical block devices 210, that are available within a storage system. In various embodiments, the virtualization functions provided by volume server 230 may be provided at different levels in the storage hierarchy between a volume client 220 and physical block devices 210.

For example, in one embodiment, volume clients 220 may be provided with a description of a virtualized block device and may be configured to directly access constituent block devices comprising the virtualized device. Such virtualization may also be referred to as host-based or client-based virtualization. In response to a request to configure a virtual block device, for example according to a desired set of virtualization features, volume server 230 may be configured to build a volume description that describes how a collection of storage objects compliant with the desired features maps to underlying physical block devices. The volume description identifying a particular volume 250 may be distributed to one or more volume clients 220. In one embodiment, such a volume description may be a tree of storage objects such as described in greater detail below in conjunction with the description of FIG. 3. Each volume client 220 may be configured to interact with volume server 230 for certain functions, for example management or administrative functions. For typical block read and write activity, each volume client 220 may be configured to interact directly with various block devices 210 according to the volume description distributed by volume server 230.

The structure of the volume 250, for example as indicated by its corresponding storage object tree, may indicate to a given volume client 220 how the volume relates to one or more underlying physical storage devices. In one embodiment, the leaf nodes of such a tree may correspond to one or more physical block devices such as block devices 210, and the root node of such a tree may be a logical block device through which the volume is accessed by a consumer. Distribution of a virtualized block device as a volume to one or more volume clients 220 may also be referred to as distributed block virtualization. In some embodiments, after volume server 230 has distributed a volume description of a given virtual block device to a given volume client 220 as a particular volume 250, the given volume client 220 may interact with that particular volume 250 to read and write blocks without further involvement on the part of volume server 230, as described above. That is, the given volume client 220 may use the structure of the particular volume 250 to transform I/O requests generated by various consumers of that volume 250 into I/O requests directed to specific physical storage devices, such as block devices 210.

In some embodiments, details of block virtualization may not be directly available to individual volume clients 220. In some such embodiments, the virtualization function of volume server 230 may be implemented in a device or layer of abstraction in between volume clients 220 and block devices 210, such as a switch or virtualization appliance. Such virtualization may also be referred to as switch-based or appliance-based virtualization.

Additionally, in some embodiments, multiple layers of virtualization may be employed, for example at the host level as well as at the switch or appliance level. In such embodiments, some aspects of virtualization may be visible to volume clients 220, as in the host-based model, while some aspects may be implemented transparently by an intermediate device, as in the switch-based model. Further, in some multilayer embodiments, the virtualization details of one block device (e.g., one volume 250) may be fully defined to a volume client 220 (i.e., without further virtualization at the switch layer), while the virtualization details of another block device (e.g., another volume) may be partially or entirely transparent to volume client 220.

Figure 3:
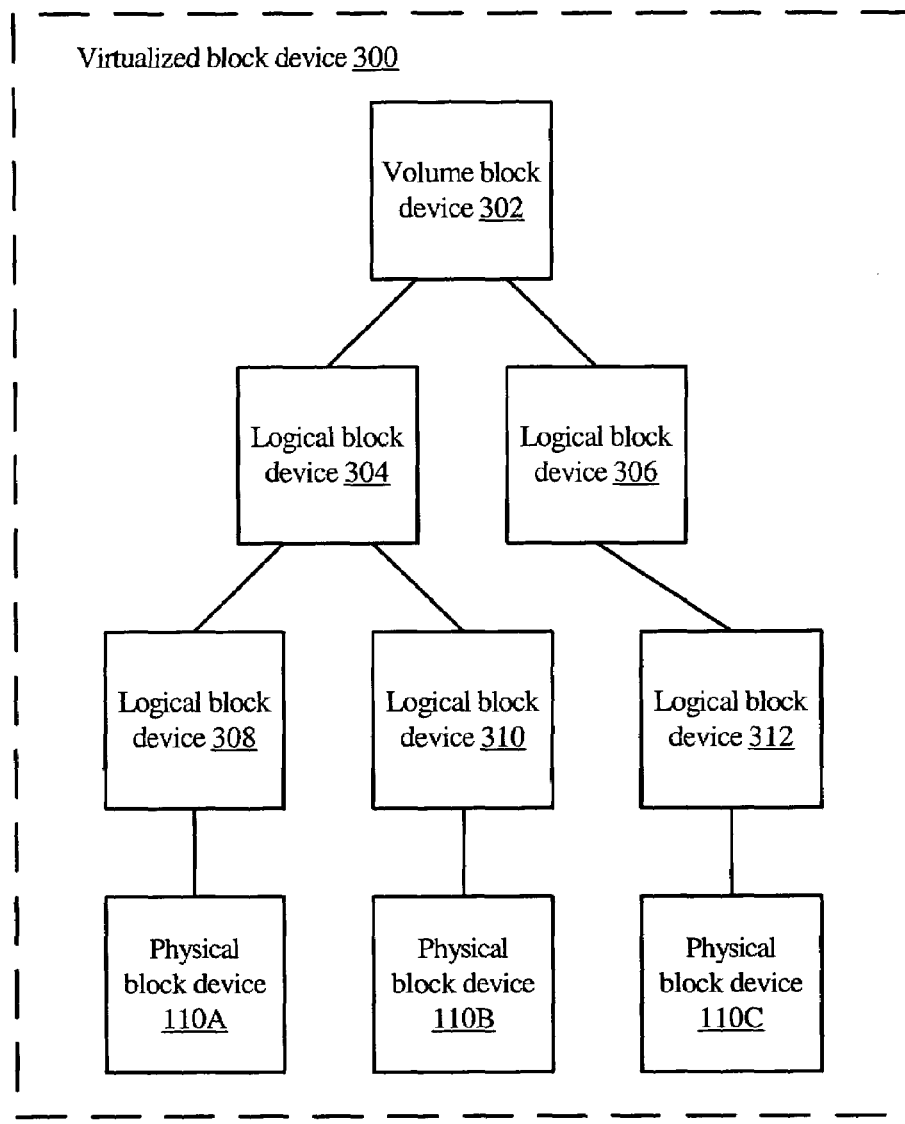
FIG. 3 is a block diagram illustrating one embodiment of a virtualized block device that may be presented as a volume.

One embodiment of a virtualized block device that may be presented to a volume client 220 as a volume 250 is illustrated in FIG. 3. In the illustrated embodiment, virtualized block device 300 includes a volume block device 302 that includes logical block devices 304 and 306. In turn, logical block device 304 includes logical block devices 308 and 310, while logical block device 306 includes logical block device 312. Logical block devices 308 and 310 map to physical block devices 210A-B of FIG. 2, respectively, while logical block device 312 maps to an additional physical block device 210C that may be hosted at a storage server such as 140B.

Virtualized block device 300 may in its entirety represent the structure of the data comprising a given volume 250, which data may be physically stored in physical block devices 210A-C. Volume block device 302 may be configured to be mounted within a file system or presented to an application or other volume consumer as the interface through which the consumer may interact with given volume 250. Each block device that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally, a given block device may be configured to map the logical block spaces of subordinate block devices into its logical block space in various ways in order to realize a particular virtualization function. For example, in one embodiment, virtualized block device 300 may be configured as a mirrored volume, in which a given data block written to virtualized storage device 300 is duplicated, and each of the multiple copies of the duplicated given data block are stored in respective block devices. In one such embodiment, volume block device 302 may be configured to receive an operation to write a data block from a consumer of corresponding volume 250. Volume block device 302 may duplicate the write operation and issue the write operation to both logical block devices 304 and 306, such that the block is written to both devices. In this context, logical block devices 304 and 306 may be referred to as mirrored plexes, mirror devices, or simply mirrors. In various embodiments, volume block device 302 may read a given data block stored in duplicate in logical block devices 304 and 306 by issuing a read operation to one mirror device or the other, for example by alternating devices or defaulting to a particular device. Alternatively, volume block device 302 may issue a read operation to multiple mirror devices and accept results from the fastest responder.

Figure 4:
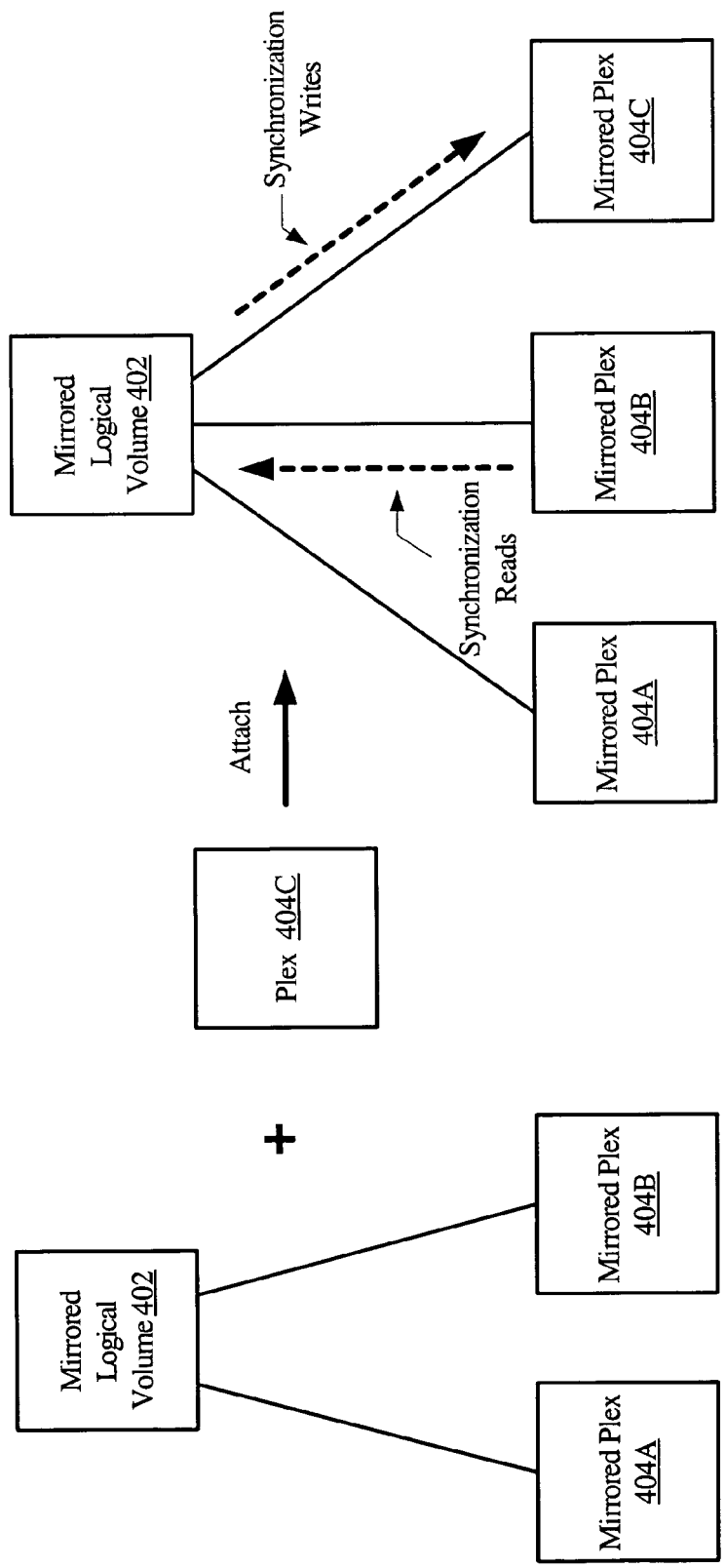
FIG. 4 is a block diagram illustrating an addition of a plex to a mirrored volume according to one embodiment.

One or more additional mirrors or plexes may be added to a mirrored logical volume, such as volume 302, to support an enhanced level of availability and/or to support functionality such as snapshots. FIG. 4 illustrates an addition (via a mirror attach operation) of a third plex 404C to a mirrored volume 402 containing two existing mirrored plexes 404A and 404B. Prior to the addition of plex 404C, mirrored plexes 404A and 404B may contain identical copies of the data of volume 402. Subsequent to the attach, data from one or both of the pre-existing plexes 404A-B may be copied to the newly attached plex in order to ensure that all three plexes eventually contain identical data. Thus, for example, data may be read from mirrored plex 404B and written to plex 404C, as shown. During such a synchronization phase, an application (e.g., a database management system) at a volume client authorized to access volume 402 may continue to perform I/O operations on volume 402, which may result in a mix of concurrent application reads, application writes, synchronization reads and synchronization writes at the physical block devices underlying plexes 404A-C.

Such a mixing of client-initiated and system-initiated I/O operations may require some form of concurrency control to prevent inter-mirror inconsistencies. For example, the following physical I/O operations may need to be performed (among others) if a client application attempts to update a mirrored block B while plex 404C is being resynchronized: (1) Synch Read SR1 (read block B from plex 404B), (2) Synch Write SW1 (write block B to plex 404C), (3) Client Write CW1 (write block B to plex 404B), and (4) Client Write CW2 (write block B to plex 404C, requested by the client application to keep plexes 404B and 404C consistent). If these four operations are performed in the order SR1-SW1-CW1-CW2, plexes 404B and 404C may be consistent and may contain the client's updated data in block B after all four I/Os are complete. However, if for some reason the sequence in which the physical I/Os are performed is SR1-CW1-CW2-SW1 or SR1-CW2-CW1-SW1, plex 404B may contain the client's updated data at the end of the sequence, while plex 404C may contain the old version of block B read during SR1. Therefore, an interlocking or serialization mechanism may be required to order concurrent writes to the same block or region (e.g., some writes being performed directly on behalf of external applications, and some being performed for configuration operations such as mirror synchronizations) in a sequence that prevents a mirrored plex 404 from becoming inconsistent with other mirrored plexes of the same mirrored volume 402. A technique to reduce the amount of messaging overhead required for such interlocking in distributed virtualization environments is described in further detail below:

As described above and shown in FIG. 3, in some embodiments a virtualized block device 300 may employ multiple layers of virtualization. For example, in the embodiment described above where logical block devices 304 and 306 function as mirror devices, it may be the case that underlying physical block devices 210A-C have dissimilar performance characteristics; specifically, devices 210A-B may be slower than device 210C.

In order to balance the performance of the mirror devices, in one embodiment, logical block device 304 may be implemented as a striped device in which data is distributed between logical block devices 308 and 310. For example, even- and odd-numbered blocks of logical block device 304 may be mapped to logical block devices 308 and 310 respectively, each of which may be configured to map in turn to all or some portion of physical block devices 210A-B respectively. In such an embodiment, block read/write throughput may be increased over a non-striped configuration, as logical block device 304 may be able to read or write two blocks concurrently instead of one. Numerous striping arrangements involving various distributions of blocks to logical block devices are possible and contemplated; such arrangements may be chosen to optimize for various data usage patterns such as predominantly sequential or random usage patterns.

In another aspect illustrating multiple layers of block virtualization, in one embodiment physical block device 210C may employ a different block size than logical block device 306. In such an embodiment, logical block device 312 may be configured to translate between the two physical block sizes and to map the logical block space define by logical block device 306 to the physical block space defined by physical block device 210C. In some instances, the logical block space of logical block device 312 need not be contiguously mapped to blocks of physical block device 210C; an arbitrary mapping may be used.

Numerous other possible configurations of block devices are contemplated that may incorporate more or fewer layers of virtualization to realize within a given instance of virtualized block device 300 virtualization functions similar to or different from those described above. For example, volume block device 302 may employ a greater number of mirror devices, striping may occur higher in the hierarchy than mirroring, certain logical block devices may be configured to perform snapshots of other devices, certain logical block devices may span multiple physical block devices, etc.

Figure 5:
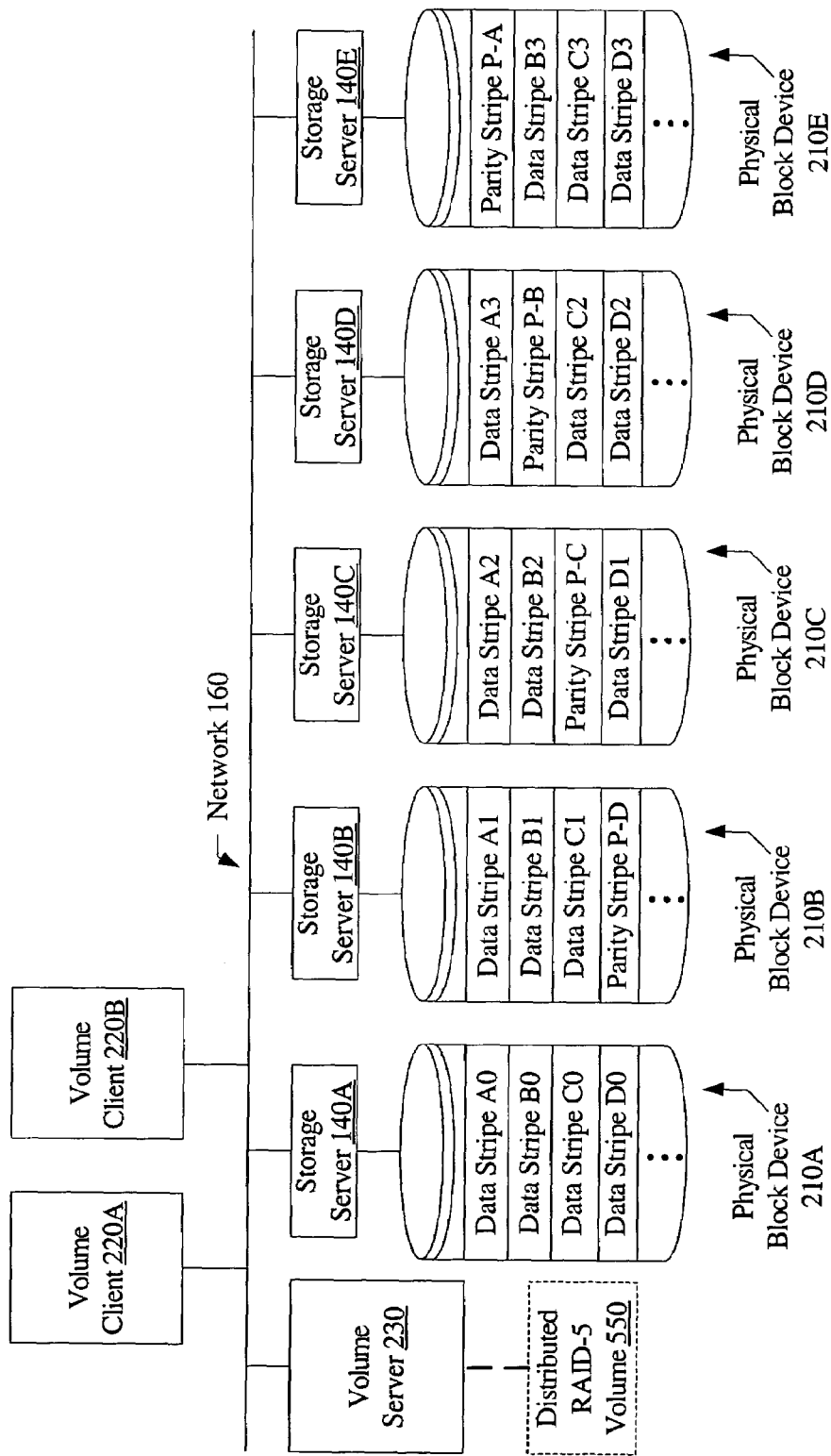
FIG. 5 is a block diagram illustrating one embodiment of a storage system including a distributed virtual RAID-5 device.

In one embodiment, illustrated in FIG. 5, a block device may be configured as a distributed virtual RAID-5 (Redundant Array of Inexpensive Disks—Level 5) device 550. As shown, volume server 230 may aggregate storage within physical block devices 210A-E spread across multiple storage servers 140A-E, and present the aggregated storage to volume clients 220 as a single virtual RAID-5 device (i.e., a device implementing the RAID-5 architecture, where logically consecutive data units are interleaved across three or more physical storage devices, and parity data units are distributed among all the physical storage devices). For example, as shown, the data of device 550 may consist of equally-sized data stripe units A0, A1, A2, and A3 forming a data stripe A, logically followed by a data stripe B containing data stripe units B0, B1, B2, B3, followed by a data stripe C, and so on. For each data stripe consisting of four data stripe units, a parity stripe unit of the same size as one data stripe unit may be derived and stored; for example, parity stripe unit P-A may be obtained by performing logical exclusive-OR (XOR) operations on corresponding bits of data stripe units A0, A1, A2, and A3. Thus, bit 0 of the parity stripe unit P-A may be obtained by performing an XOR operation between bit 0 of A0 and bit 0 of A1 to yield a result bit R1, followed by an XOR of R1 with bit 0 of A2 to yield a second result bit R2, followed by an XOR of R2 with bit 0 of A3. As shown, each set of five stripe units (four data stripe units and a corresponding parity stripe unit) may be distributed across the five physical block devices according to the RAID-5 architecture. Thus, for data stripe A, data stripe units A0-A4 may be placed at physical block device 210A-D, and parity stripe unit P-A at physical block device 210E; while for data stripe B, data stripe units B0-B3 may be placed at physical block device 210A-C, parity stripe unit P-B at physical block device 210D, and data stripe unit B4 at physical block device 210E. Similarly, the data stripe units and parity stripe units for each successive data stripe may be spread over each of the five physical block devices shown.

An update to a data stripe unit such as A0 requested by an application at a volume client 220 may require that a new parity value for data stripe A be calculated and stored at the appropriate physical block device (e.g., 210E in the case of A0). An XOR of the old and new versions of data stripe unit A0, followed by an XOR of the result of that operation with the old parity stripe unit P-A, may yield the desired new parity stripe unit. Using this technique, two stripe unit reads (old data, old parity) and two stripe unit writes (new data, new parity) may be required to update a data stripe unit and its associated parity. (This may be more efficient than reading all old data stripe units A1-A3, performing the required XORs on the new data stripe unit A0 and the old data stripe units, and writing the new data stripe unit and the new parity stripe unit—a total of five stripe units read or written, and three stripe unit XOR operations, for one data stripe update in the depicted configuration). The configuration of a virtual distributed RAID-5 device in the manner described above may provide data availability in the event of a failure of a storage server (in contrast, a hardware RAID-5 device may become unavailable if its hosting storage server fails). Further details on a technique that may reduce the amount of update-related network traffic among volume clients 220 and disk servers 140 in a distributed RAID-5 environment are provided below. Various other distributed virtual RAID devices may also be provided in a block virtualization environments in accordance with different RAID architectures, e.g., RAID-4.

In one embodiment, volume server 230 may be configured to read and update configuration information corresponding to volume descriptions (such as a storage object tree corresponding to a given volume) from a configuration database. The configuration information in the database may establish the logical configuration of data on the physical block devices 210. For example, such configuration information may indicate how various logical and physical block devices are divided, striped, mirrored, etc. In one embodiment, the configuration information may be stored on the devices (e.g., block devices 210) that are being virtualized. It is contemplated that in some embodiments, configuration of a given virtualized block device may be managed and/or stored in data structures other than trees of objects. For example, in one embodiment, tables may be used to map virtual block devices to physical storage.

As noted above, the configuration associated with a virtual block device may change over time, such as to add or remove mirrors; migrate data to new storage; increase or decrease the size of the device; create, manipulate, or remove snapshots; add structure for a new capability; etc. In some embodiments, if the volume description of a given volume 250 is distributed to more than one volume client 220, any changes that affect the structure of the given volume 250 may need to be coherently coordinated among the relevant volume clients 220. In one embodiment volume server 230 may be configured to coordinate such changes. For example, volume server 230 may be configured to coordinate quiescence of those volume clients 220 to which the given volume 250 is distributed, in order to temporarily suspend activity to given volume 250. Volume server 230 may further distribute changes to the structure of given volume 250 to relevant volume clients 220 in an effectively atomic fashion, such that either all or none of the relevant clients 220 receive the changes, and/or such that no I/O request to the volume is applied to a partially reconfigured volume.

In some embodiments, volume server 230 may be configured to distribute all defined volumes 250 to each volume client 220 present within a system. Such embodiments may be referred to as symmetric distributed block virtualization systems. In other embodiments, specific volumes may be distributed only to respective volume clients 220, such that at least one volume 250 is not common to two volume clients 220. Such embodiments may be referred to as asymmetric distributed block virtualization systems.

As described above, in some embodiments volume server 230 may provide a volume description (e.g., including a structure or layout description) for a given volume 250 to one or more volume clients 220. A volume client 220 may be able to use the volume description to translate a desired logical I/O operation to one or more physical I/O operations. For example, a volume client 220 may be able to translate a logical update of block X of mirrored volume 250 to two physical writes: a first write to a block Y of first physical block device 210A of a first mirrored plex of volume 250, and a second physical write to a block Z of a second physical block device 210B of a second mirrored plex of volume 250. The volume client may then be in a position to perform each of the required physical I/O operations, e.g., by sending a first write request to a storage server 140A managing access to physical block device 210A, and a second write request to a storage server 140B managing access to physical block device 210B.

In an update-intensive storage environment including hundreds or thousands of volume clients 220, outbound network paths from volume clients 220 to storage servers 140 may become heavily utilized, especially if individual update requests modify relatively large amounts of data. In environments where the networking infrastructure between volume clients 220 and storage servers 140 supports full-duplex traffic, i.e., where the available network bandwidth for data traffic from a storage server 140 does not differ much from the available network bandwidth for data traffic to the storage server 140, it may be advantageous to offload some update-related data traffic from the outbound network paths of volume clients 120, as described below.

Figure 6:
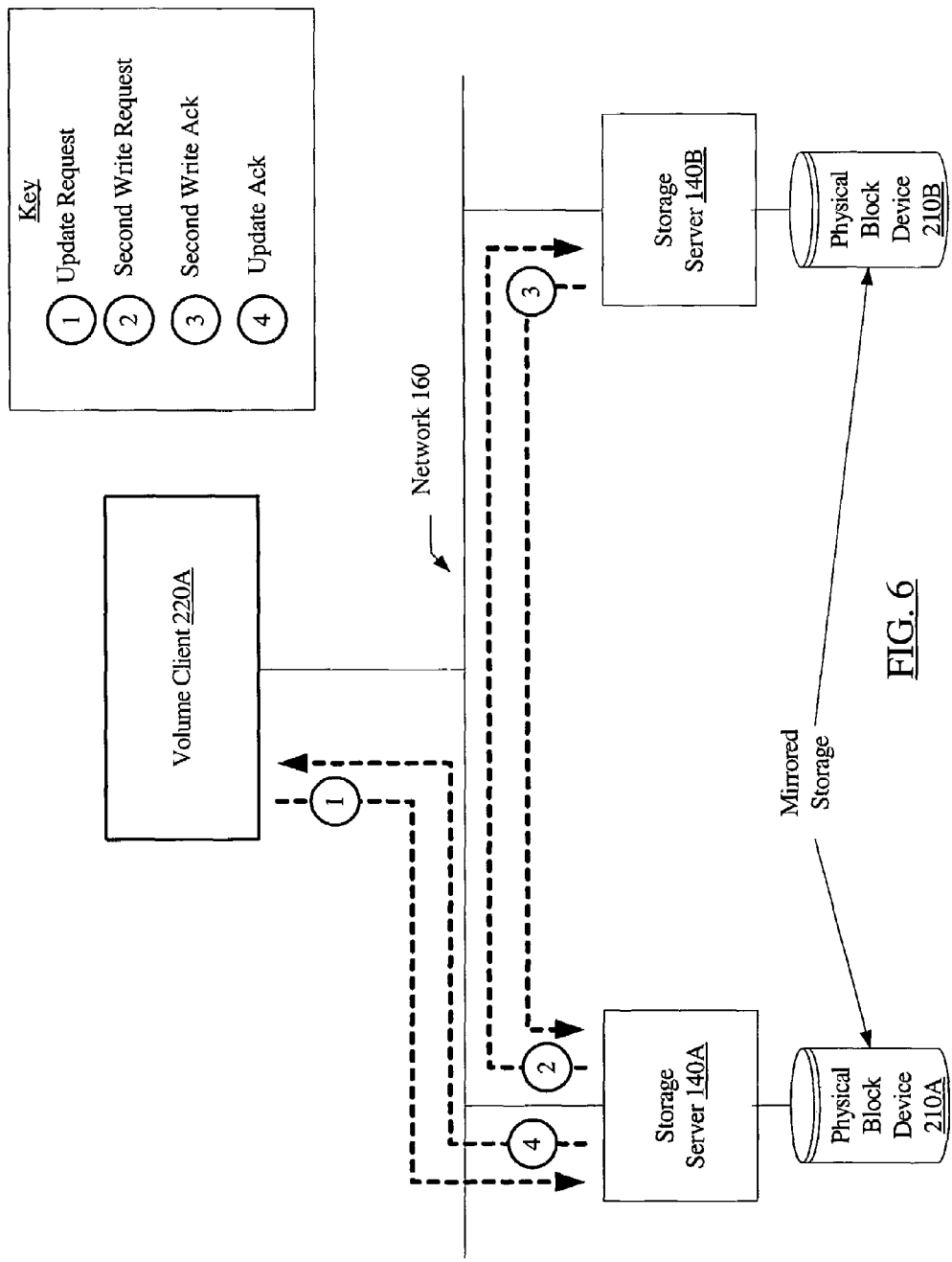
FIG. 6 is a block diagram illustrating update-related message traffic flow between a volume client and two storage servers according to one embodiment.
Figure 7:
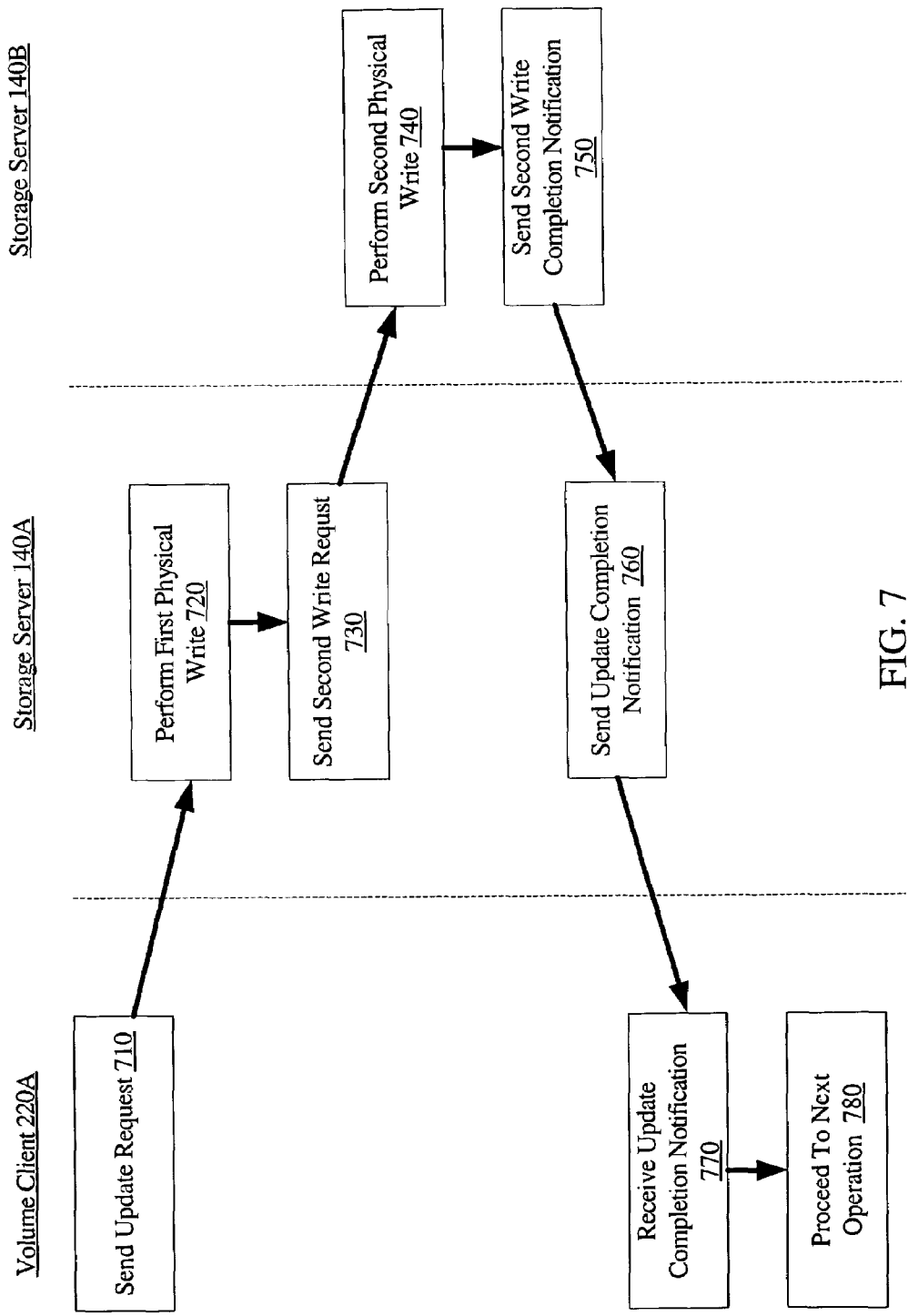
FIG. 7 is a flow diagram illustrating aspects of the operation of a volume client and two storage servers in one embodiment of a storage system employing write forwarding.

FIG. 6 (a block diagram) and FIG. 7 (a flow chart) collectively illustrate update-related message traffic flow between a volume client 220A and two storage servers 140A and 140B according to one embodiment. Storage servers 140A and 140B may provide access to physical block devices 210A and 210B, respectively, each of which may contain a mirror of logical volume 250. Thus, an update to a data block within volume 250 may require two physical write operations: a first physical write operation at physical block device 210A, and a second physical write at physical block device 2103B. In the illustrated embodiment, volume client 220A may send an update request to storage server 140A (message 1 in FIG. 6, block 710 in FIG. 7). In the illustrated embodiment, storage server 140A may start the first physical write operation (block 720 in FIG. 7) and may send a request for the second physical write operation to storage server 140B (message 2 in FIG. 6, block 730 in FIG. 7).

Storage server 140A may be configured to ensure that the update has been made persistent at both storage servers (140A and 140B) prior to returning an indication of update completion to requesting volume client 220A. The update may be made persistent at either storage server by, for example, writing the updated data directly to a physical block device (210A or 210B) such as a disk, or to a non-volatile RAM (NVRAM) or other persistent write-back cache that may serve as a front-end for a physical block device.

On receiving message 2, storage server 140B may perform the second physical write operation (block 740 in FIG. 7), and send message 3 back to storage server 140A acknowledging that the second physical write has been completed (block 750 in FIG. 7). In one embodiment, the request for the second physical write operation (message 2) may be sent prior to the commencement of the first physical write operation at storage server 140A. It is noted that, in different embodiments, the first and second physical write operations may commence in any order (i.e., the first physical write operation may start after the second physical write operation starts, or the second physical write operation may start after the first physical operation starts, or both physical write operations may start simultaneously), and that the first and second physical writes may also complete in any order.

When storage server 140A has completed the first physical write operation (block 735) and has received the acknowledgment indicating that the second physical write has been completed at storage server 140B, storage server 140A may send message 4 indicating a completion of the update operation back to volume client 220A (block 760 in FIG. 7). Volume client 220A may receive message 4 (block 770 in FIG. 7) and proceed to a next operation (block 780 in FIG. 7). The illustrated technique, wherein a first storage server (such as 140A) requests one or more additional write operations at other storage servers on behalf of a storage client such as volume client 220A, may also be termed "write forwarding", and the first storage server may be said to "forward" the one or more additional write requests to other storage servers.

In the illustrated embodiment, the outbound update-related data traffic from volume client 220A may consist of a single update request message (message 1 in FIG. 6). This is in contrast to the two messages that would be required if volume client 220A were configured to send individual update requests to each storage server 140A and 140B (if, for example, a volume server 230 had provided a layout of volume 250 to volume client 220A, allowing volume client 220A to translate the update request to two physical write requests). In update-intensive storage environments with numerous volume clients updating large amounts of data, such a traffic reduction may lead to substantial reduction in network congestion between the volume clients and the rest of system 100. The reduction in network congestion may be especially beneficial if, for example, the network path between volume client 220A and storage server 140A includes multiple hops (for example, if volume client 220A accesses volume 250 from a remote location or over the Internet), while the network path between storage server 140A and storage server 140B is relatively short (for example, if the two storage servers are located within a single data center). In addition to a reduction in network congestion, the use of write forwarding may also result in a reduced processor load at volume clients: for example, part of the processing required to assemble the updated data blocks for the second physical write operation into one or more write buffers, and/or to copy data between application and kernel memory, may be offloaded from volume clients when write forwarding is employed. Any additional latency incurred by the messaging required between storage servers 140A and 140B prior to the completion of the update may be more than compensated for by an improvement in outbound network message latency (due to the reduced congestion) and a reduction in processor load at volume client 220A.

In general, the benefit of write forwarding may increase with the average update request size: that is, if the amount of data typically updated as part of a single request increases, a relatively greater reduction in network congestion for outbound traffic from volume clients may be experienced. In some environments, a threshold update size may be used at volume client 220A to select between two modes of updates: a first mode, in which write forwarding as described above is employed, may be used if an update modifies an amount of data larger than a specified threshold (e.g., 128 KiloBytes), while a second mode, in which volume client 220A may send individual update requests to more than one storage server 140, may be employed if the amount of data is smaller than or equal to the specified threshold. Using such a threshold-based policy, the benefits of write forwarding may be obtained for larger updates, where the benefits are relatively greater, while small updates may be protected from any increase in update latency associated with write forwarding.

As described previously, the layout or structure of logical volume 250 may be provided to a volume client 220 by volume server 230 in some embodiments, to enable the volume client 220 to translate a desired logical I/O operation to one or more physical I/O operations. In order to support write forwarding as illustrated in FIG. 6, storage server 140A must similarly be made aware of a destination to which the forwarded write request (e.g., message 2 in FIG. 6) should be directed. A variety of techniques may be used to provide such destination information for the forwarded write request to storage server 140A in different embodiments. In one embodiment, volume server 230 may be configured to provide the layout of volume 250 to storage servers 140. In such an embodiment, a storage server 140 may be able to use the layout to identify a destination for a second physical I/O operation corresponding to a physical address targeted by the update request made by volume client 220A. In some embodiments, volume client 220A may include a logical address within its update request rather than a physical address, and storage server 140 may translate the logical address to the first and second physical addresses for the first and second physical write operations respectively. In yet other embodiments, volume client 220A may include both the first physical address and the second physical address with its update request, along with a tag or directive requesting storage server 140A to forward the second physical write operation without the use of a layout. Thus, a translation of a logical address for the requested update to the physical storage addresses at which the first and second write operations may be performed may be done either at a volume client 220 or at a storage server 140.

FIG. 6 and FIG. 7 illustrate the use of write forwarding in a storage environment where the data of logical volume 250 is mirrored across two physical block devices 210, each accessible via a respective storage server 140. Write forwarding may be employed in other storage configurations as well, for example in embodiments where a logical volume is mirrored across more than two storage devices managed by multiple storage servers. In one embodiment employing more than two storage servers 140, a first storage server 140A may be configured to broadcast or multicast a message containing the update data to the remaining storage servers where physical write operations are required. That is, a single message containing a copy of the updated data blocks and required addressing information (i.e., enough addressing information for any one of the remaining storage servers 140 to perform the requested physical write operation at its local physical storage device 110) may be directed by storage server 140A to remaining storage servers 140, further reducing the amount of update-related data traffic. In another embodiment, storage server 140A may forward individual write requests to each remaining storage server 140. In some multi-mirror embodiments, storage server 140A may wait for only a majority of the remaining storage servers 140, rather than waiting for all remaining storage servers 140, before sending an update completion indication message back to volume client 220A.

In some embodiments, storage server 140A may be configured to perform one or more transformations on updated data before forwarding a write request to a second storage server 140B. For example, in one embodiment, storage server 140A may be configured to derive a delta or difference between an earlier version of an updated block and the updated version of the updated block, and forward only the delta to second storage server 140B. In another embodiment, storage server 140A may be configured to perform a compression operation on the updated data, and forward the compressed version to second storage server 140B.

Figure 8:
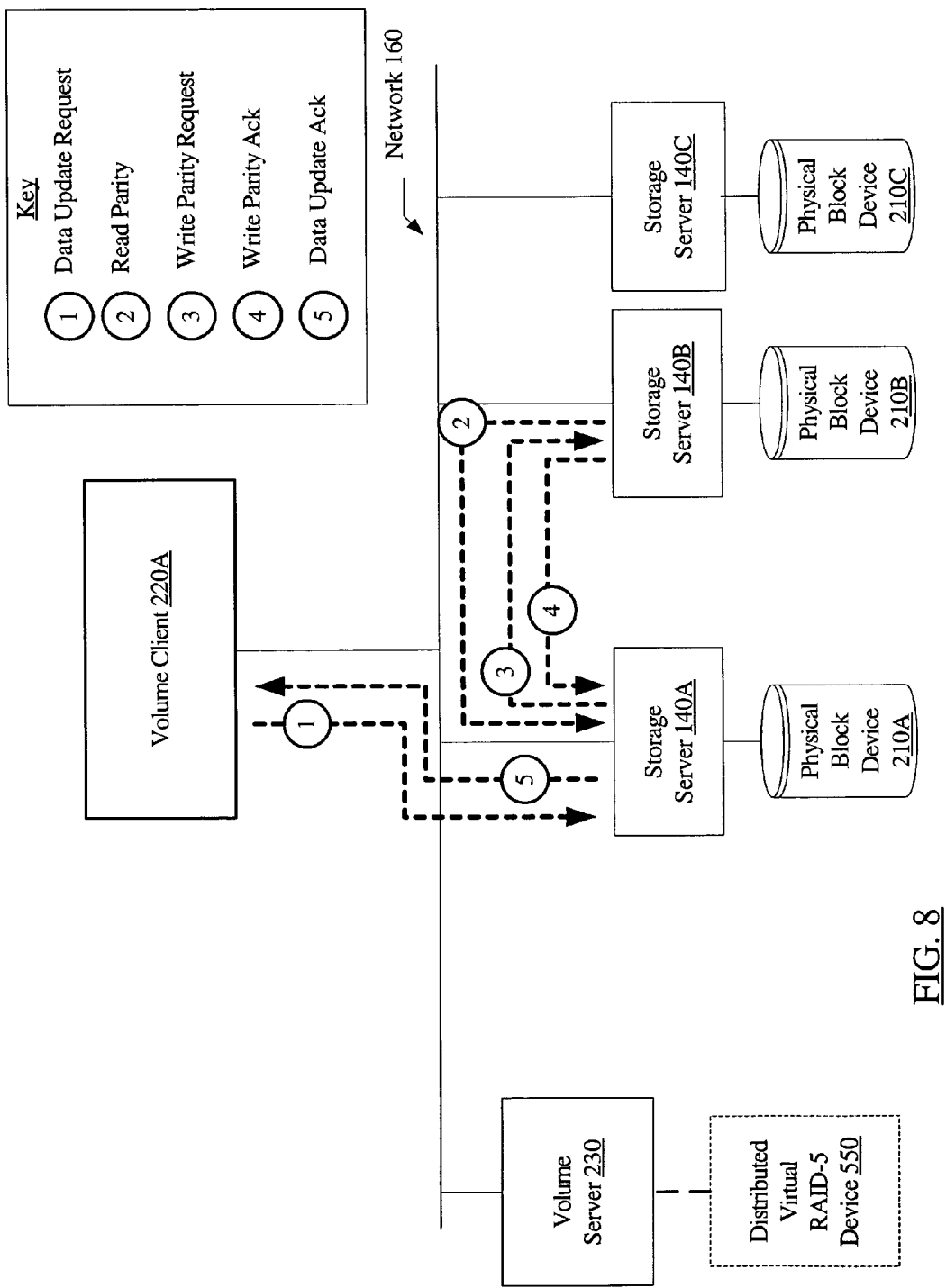
FIG. 8 is a block diagram illustrating the use of write forwarding in an embodiment including a distributed virtual RAID-5 device.

In addition to being employed in mirrored storage environments, write forwarding may also be used in a variety of other virtualization environments where a single logical update may result in multiple physical write operations, such as distributed virtual RAID devices (e.g., RAID-2, RAID-3, RAID-4 or RAID-5), or other storage environments where parity mechanisms and/or checksums are used. FIG. 8 is a block diagram illustrating the use of write forwarding in an embodiment including a distributed virtual RAID-5 device 550. As noted previously in conjunction with the description of FIG. 5, an update to a data block (e.g., block D0 of FIG. 5) at a first storage server 140A of a distributed virtual RAID-5 device may require a second update of a parity block at a second storage server such as 140B. Volume client 220A may send an update request for a data block to storage server 140A (message 1 in FIG. 8). In order to derive a new version of a parity block corresponding to the updated data block, storage server 140A may request a read operation on the existing version of the parity block accessible from storage server 140B (message 2), and may perform a local read operation on physical block device 210A to obtain an old version of the updated data block. Having the old data, the new data, and the old parity, a new version of the parity may be derived as described earlier by a sequence of XOR operations. Next, storage server 140A may send a request to write the new parity block to storage server 140B (message 3). Upon receiving the parity write request, storage server 140B may write the new parity block to physical block device 210B, and send a message back to storage server 140A indicating that the parity has been written (message 4). Storage server 140A may then send a message to volume client 220A indicating that the data update has completed (message 5).

The exact sequence and content of messages exchanged among storage servers 140 in a distributed virtual RAID environment, and the manner in which parity computation tasks are distributed, may differ in different embodiments. In one embodiment, an updated data block may be delivered to and made persistent at two storage servers 140A and 140B (e.g., a first storage server for the data block and a second storage server for a corresponding parity block) prior to returning a completion indication to the updating volume client 220A. The delivery of the updated data block to second storage server 140B may be accomplished using write forwarding from first storage server 140A. The updated block may be stored in an NVRAM cache, and thereby made persistent, at each storage server 140A and 140B. After receiving a message indicating that the data block has been made persistent at storage server 140B, and after making its local copy of the updated block persistent in its own NVRAM cache, storage server 140A may return an update completion indication to volume client 220A. The following steps, required for parity computation and update, may then be performed cooperatively by storage servers 140A and 140B, asynchronously with respect to the update requested by volume client 220A. Prior to being overwritten at the backing physical block device (e.g., physical block device 210A), the previous version of the updated data block may be provided to the parity storage server (e.g., 140B). The parity storage server may be configured to obtain any additional blocks that may be required for the calculation of the new parity, (e.g. the old version of the parity block) by performing local read operations and/or by sending requests to other storage servers. After accumulating the required blocks, the parity server may compute the new parity block and make it persistent for eventual transfer to the parity physical block device.

In another embodiment, for example, storage server 140A may derive an intermediate block of data representing an XOR of the old and new versions of the updated data, and send the intermediate block to storage server 140B instead of requesting that the old parity block be sent to storage server 140A. Storage server 140B may derive the new parity by performing an XOR operation between the intermediate block and the old parity, and write the new parity to physical block device 210B as in FIG. 8. Variations of the basic write-forwarding technique described herein may be employed to deal with special cases like update requests that span multiple consecutive data blocks (e.g., a single update request to update data stripe units A0, A1, A2 of data stripe A). In one embodiment, for example, storage server 140A may perform a sequence of XORs on the consecutive updated data stripe units, and forward an intermediate XOR result to parity storage server 140B, where the new version of the corresponding parity stripe unit may be calculated and stored.

In a distributed block virtualization environment such as the mirrored storage environments and distributed virtual RAID environment described above, multiple storage consumers may wish to update a given block of data at about the same time. The sequencing of concurrent writes by a given client application (such as a database) to prevent data inconsistency may typically be managed at the application layer (e.g., by using standard database concurrency control techniques such as table locking or row locking). As noted earlier in conjunction with the description of FIG. 4, however, in some cases client-initiated updates and updates performed on behalf of internal operations such as mirror resynchronizations may also be concurrently targeted at the same set of data blocks, which may potentially lead to inconsistencies. A number of techniques may be employed to prevent such inconsistencies in distributed block virtualization environments. For example, distributed locking may be used in some environments, where a lock corresponding to a given logical data block of a mirrored volume may be required to be obtained by a storage server prior to a physical update of any mirrored copy of the logical data block. However, such techniques may require frequent messages exchanging locks between storage servers 140 (or other update initiators such as volume clients 220 and/or volume servers 230). A technique that combines write forwarding with update coordination at a single storage server to reduce the amount of messaging required for consistent updates of mirrored or distributed virtual RAID data is described below.

Figure 9:
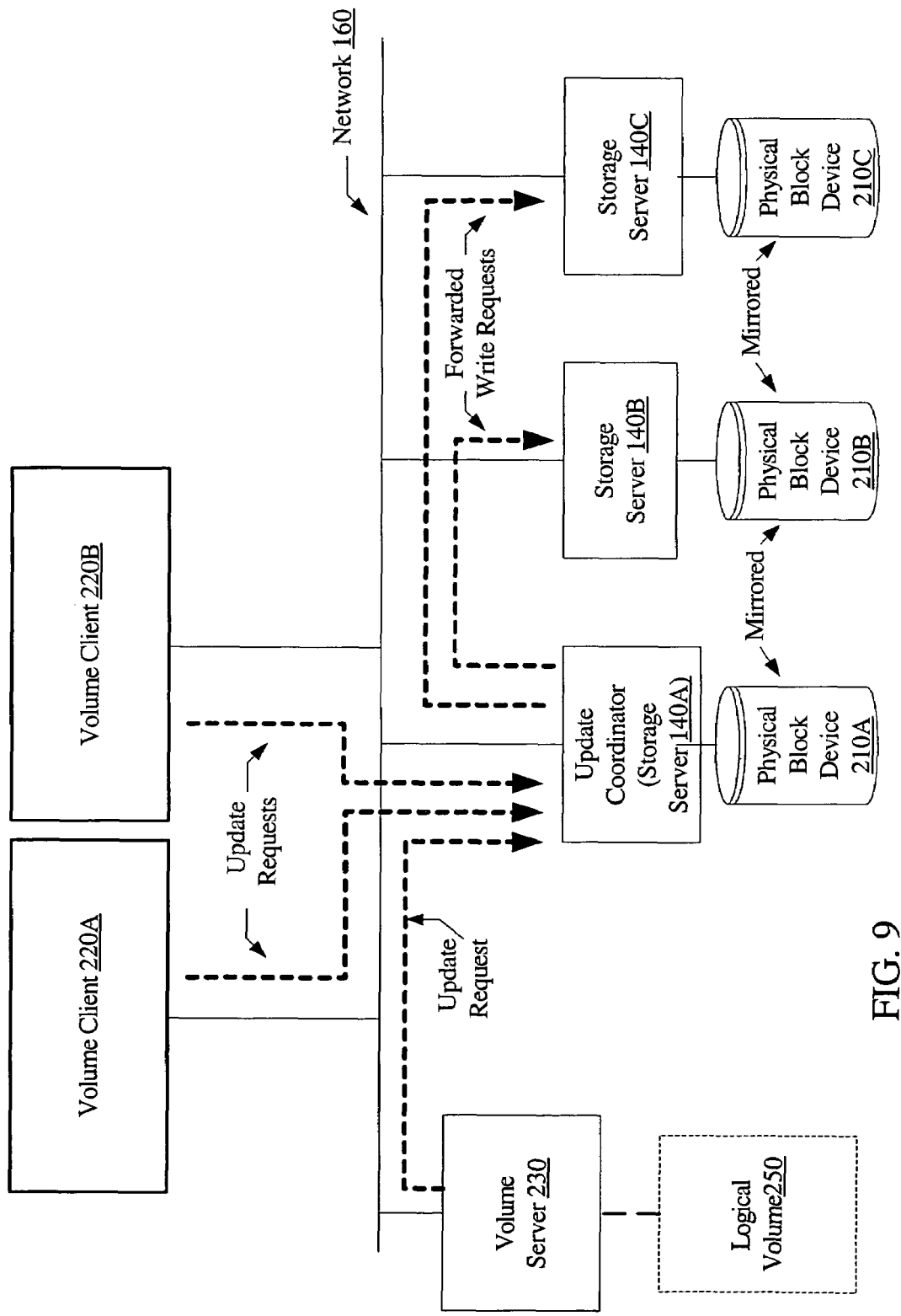
FIG. 9 is a block diagram illustrating a use of write forwarding according to one embodiment, where a storage server is designated as an update coordinator for a logical volume.

FIG. 9 is a block diagram illustrating a use of write forwarding according to one embodiment, where a storage server 140A is designated as an update coordinator for an entire logical volume 250. That is, update requests for a logical block of volume 250 from any consumer of volume 250, including volume clients 220A and 220B, volume server 230, and other storage servers 140, may be sent to update coordinator 140A, as shown. The data of logical volume 250 may be mirrored across physical block devices 210A, 210B and 210C, managed at storage servers 140A, 140B, and 140C respectively. Update coordinator 140A may be configured to forward write requests to storage servers 140B and 140C as needed, and to perform any I/O interlocking required to preserve data consistency. That is, update coordinator 140A may be configured to ensure that physical write operations corresponding to concurrent overlapping updates (i.e., more than one update directed at the same logical data block) of volume 250 are performed in a sequence that maintains data consistency. As all physical write operations for a block of volume 250 may be initiated by update coordinator 140A, no locks may need to be exchanged over network 160 between storage servers 140, or between volume clients 220, volume server 230 and storage servers 140, in order to preserver consistency. In other embodiments including a distributed virtual RAID device (such as volume 550 of FIG. 8), a specific storage server 140A may be designated as an update coordinator for the virtual RAID device, and may perform the interlocking functionality described above. It is noted that in some embodiments, the role of update coordinator may be transferred from one storage server to another, for example as part of a configuration change performed by volume server 230.

In some environments, requiring a single storage server 140 to coordinate all the updates for a large logical volume 250 or 550 may result in excessive contention for resources (e.g., processors, memory, disks or network cards and/or network connections) at the storage server. In order to reduce such resource contention, the workload of an coordinating updates for a volume may be distributed across several storage servers in some embodiments.

Figure 10:
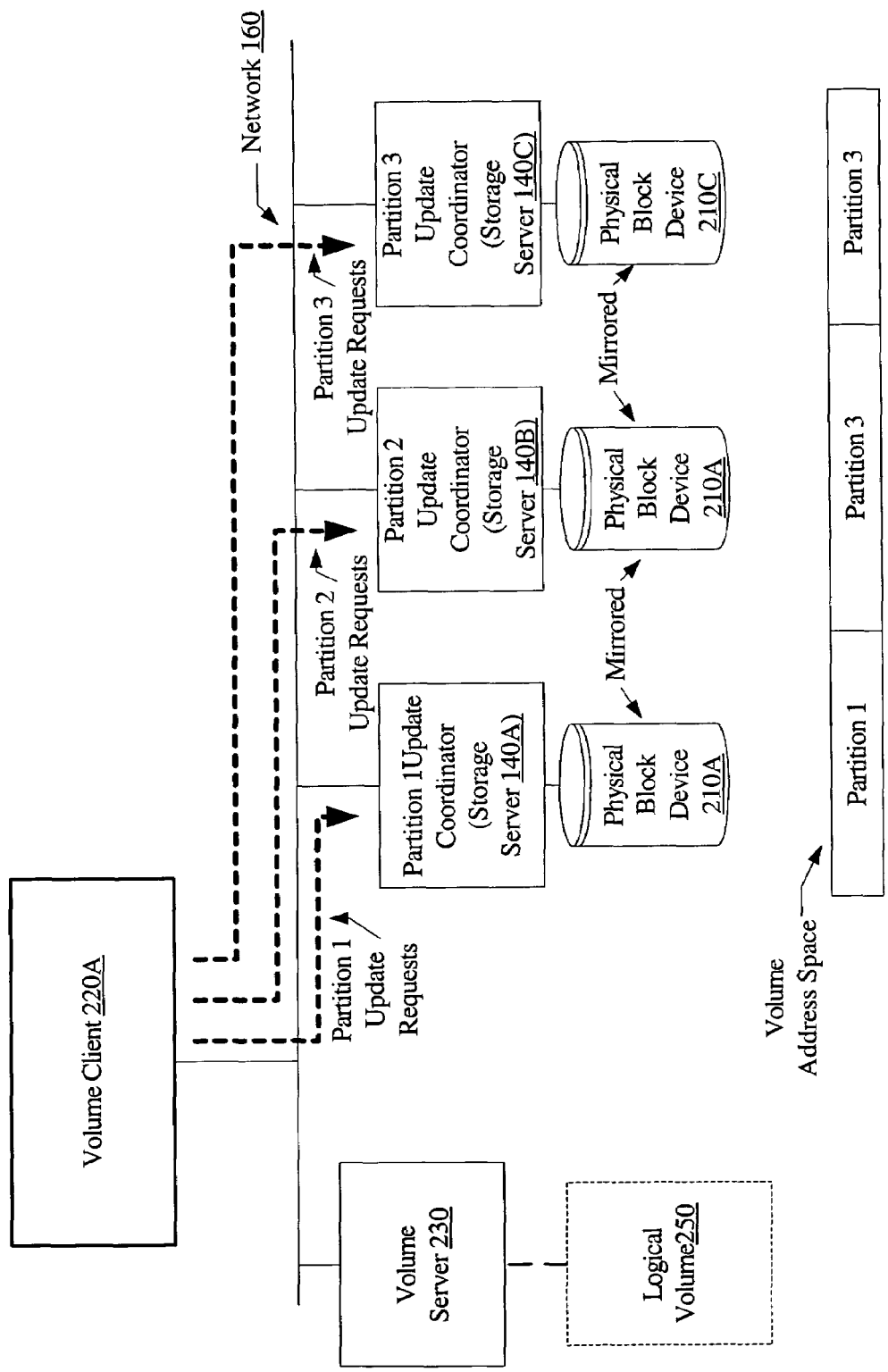
FIG. 10 is a block diagram illustrating one embodiment where the address space of a logical volume is divided into three partitions, and where a different storage server is designated as an update coordinator for each partition.

FIG. 10 is a block diagram illustrating one embodiment where the address space of a logical volume 250 is divided into three partitions, and where a different storage server is designated as an update coordinator for each partition. As shown, three contiguous sub-ranges of the address space of volume 250 (i.e., the sequential range of numbered logical blocks included within volume 250) may have been designated as Partition 1, Partition 2, and Partition 3, respectively (for example, by volume server 230). For example, if volume 250 comprises logical blocks 1 through 300,000, Partition 1 may consist of blocks 1-100,000, Partition 2 of blocks 100,001-200,000, and Partition 3 of blocks 200,001-300,000.

Storage servers 140A, 140B, and 140C may have been designated as an update coordinator for Partition 1, Partition 2, and Partition 3, respectively. Thus, in the above example, volume client 220 (or any other volume consumer) may send a request to update block 24,032 to storage server 140A, a request to update block 176,531 to storage server 140B, and a request to update block 234,567 to storage server 140C, thereby spreading the workload related to update coordination among the three storage servers. Each partition update coordinator may perform a first physical I/O operation at its locally-managed physical block device 210, and forward write requests (in an appropriate sequence to preserve consistency as described above) to the remaining update coordinators (i.e., the remaining storage servers). Such a technique may allow distributed load balancing between storage servers, and also across network paths. For example, write-related network traffic may be distributed evenly across two sets of network paths: paths between volume clients and storage servers, and paths between different volume servers. Such a balanced distribution of write-related network traffic may contribute to an efficient utilization of network paths within system 100.

It is noted that the subdivision of volume address space into partitions may be implemented using a variety of techniques: that is, instead of dividing the address space into contiguous sub-ranges, a modulo-based technique (e.g., where two successive logical blocks are mapped to two successive partitions) may be used in one embodiment and a hash-based technique in another. In addition, in some embodiments, where for example a first subset of the available storage servers 140 may have more free resources (e.g., faster processors) than others, the different partitions may not be equal in size, and/or multiple partitions may be assigned to the same storage server 140. That is, an asymmetrical distribution of volume address space to storage servers 140 may be employed in such embodiments, e.g., so that storage servers with more resources available for update coordination may be assigned relatively larger subsets of the volume address space. In other embodiments including multiple volumes 250, not all storage servers 140 may be designated as partition update coordinators for all volumes 250 using physical block devices 210 managed by the storage servers. Some storage servers 140 may be partition update coordinators for a subset of volumes 250, while others may not be update coordinators for any partition of any volume. In one specific embodiment, the mapping between volume address space and partitions may change over time (e.g., if a volume is enlarged as part of a configuration change managed by volume server 230, partitions may be enlarged or additional partitions may be created). Similarly, the assignment of specific partitions to specific partition update coordinators may change over time in other embodiments.

As described previously, storage servers 140 may participate in a security protocol that may be implemented within system 100 to prevent unauthorized access to storage. In some embodiments, a security protocol may provide volume clients 220 with an identification of an update coordinator (such as storage server 140A) for a given logical address range, in addition to providing volume clients 220 with permissions required to access a given range of storage. For example, access tokens or capability tokens may be utilized to implement a security protocol in one embodiment. In such an embodiment, a volume client 220 may first contact volume server 230 in order to obtain permission to perform I/O on a logical volume 250. Volume server 230 may be configured to evaluate the request from volume client 220 and may, in some embodiments, require proper authentication credentials from volume client 220 before granting access permissions. When granting I/O privileges to volume client 220 regarding logical volume 250, volume server 230 may generate an access token that may specify the exact permissions and privileges provided to volume client 220 may perform on volume 250. The access token may also include an identification of a storage server 140A as the update coordinator for logical volume 250 or a partition of logical volume 250 that may be targeted for access by volume client 220. In other embodiments, the identification of an update coordinator for a volume 250 or a volume partition may be provided to a volume client 220 as part of other volume metadata distributed by volume server 230, such as the layout of the volume. In one embodiment, access tokens may include parameters related to the designation of update coordinators for ranges of storage addresses. For example, parameters for a modulo function used for selecting update coordinators could be encoded in an access token, thereby providing a secure mechanism for managing update coordination using a relatively small number of access tokens.

It is noted that in some embodiments the write forwarding techniques described above, including the association of an update coordinator storage server 140 with a range of storage addresses, may be utilized for a subset of logical volumes 250 suitable for write forwarding within a storage environment. That is, write forwarding and/or update coordination may not be employed at every logical volume 250 where a logical update may require more than one physical write operation. For example, for some relatively lightly updated mirrored logical volumes, volume clients 220 may be configured to request required physical write operations directly, instead of requesting that a storage server 140 forward write requests.

A volume server 230 may be any device or software module capable of providing volume server functionality as described above, such as a server computer system, including one or more processors and one or more system memories. Some volume server functionality may be spread over multiple computer servers or hosts in some embodiments. To provide high availability for volume server functionality, volume server 230 may be configured to run on a cluster of nodes, where a failure at one node may result in the volume server functionality running on that node being taken over at another node.

A volume client 220 may be any type of device capable of interacting with a given volume 250 for data storage and retrieval. For example, in one embodiment a volume client 220 may be a server computer system, including one or more processors and one or more system memories, where the server system is configured to execute software such as one or more operating systems and/or applications. Volume client applications may support ordinary data reads and writes as well as more advanced functionality such as volume replication, temporary mirroring related to data migration, and various mirroring operations such as mirror attach/detach and mirror resynchronization. In some embodiments volume clients, volume servers and storage servers may coordinate their operations to support the write forwarding functionality described above, with volume clients participating by directing and/or redirecting I/O requests to storage servers as appropriate, or by directly implementing other parts of the functionality. In another embodiment, a volume client 220 may be a client computer system configured to access a given volume 250 via a separate server computer system. A volume client 220 may also be hosted within a virtualization switch that provides additional layers of virtualization on top of a volume 250. Volume clients 220, volume servers 230, and storage servers 140 may be connected by a variety of different networking hardware, including Ethernets and various kinds of storage area networks. In other embodiments, a volume client 220 may be an embedded system configured to use application specific integrated circuit (ASIC) or field-programmable gate array (FPGA) technology to execute operations whereby a given volume 250 may be accessed. In some embodiments a volume client 220 and a volume server 230 may be co-located within the same server. Numerous other configurations of volume servers 230 and volume clients 220 are possible and contemplated.

Figure 11:
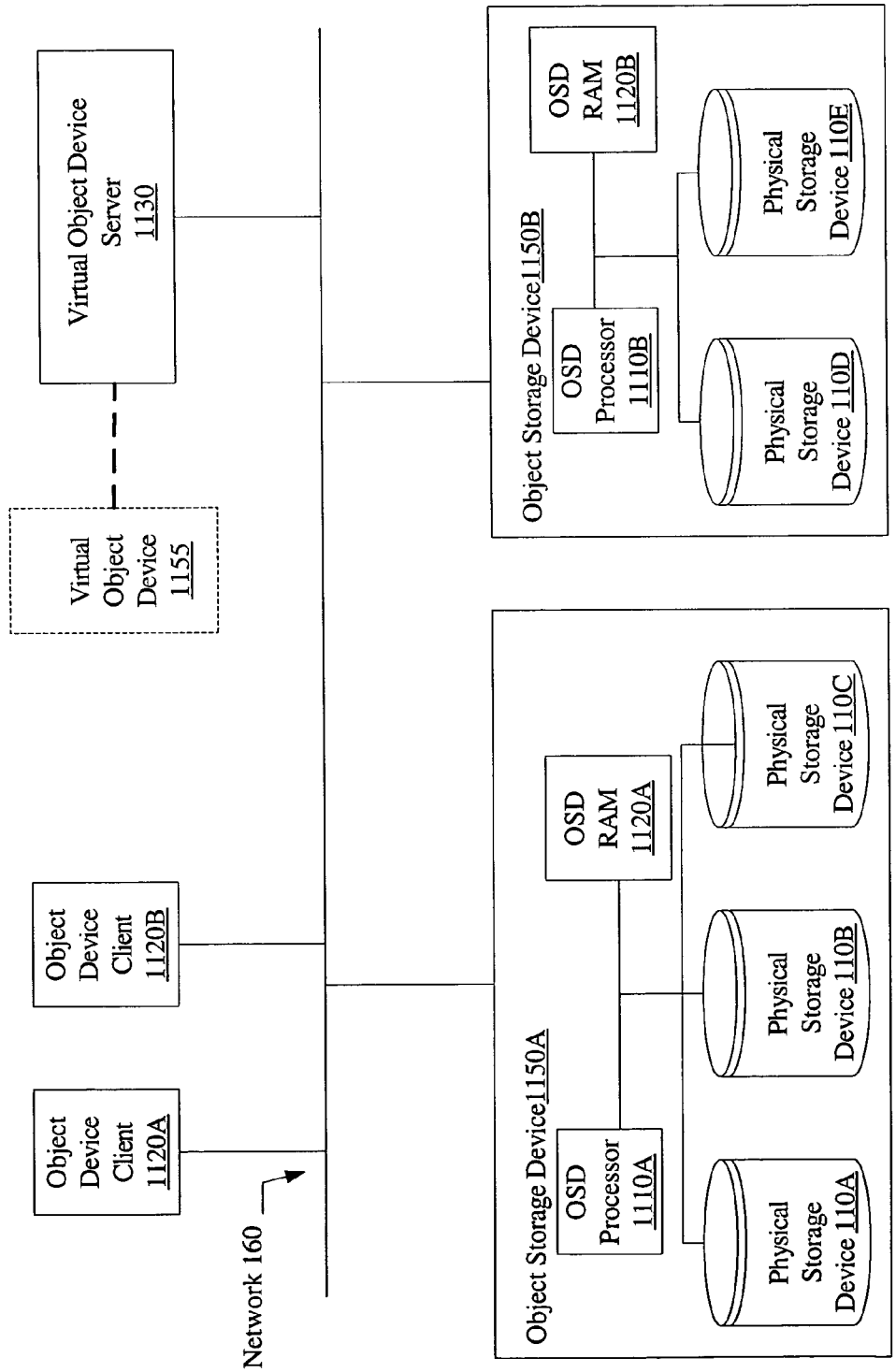
FIG. 11 is a block diagram illustrating an embodiment of an object-based storage virtualization system.

As mentioned earlier, in contrast to block virtualization environments, in some embodiments, object-based virtualization may be employed: that is, a virtual object device server may be configured to organize storage within physical storage devices 110 as higher-level logical objects (such as files) instead of using a more traditional block-based interface such as SCSI or IDE. FIG. 11 is a block diagram illustrating an embodiment of an object-based storage virtualization system that conforms generally to the system illustrated in FIG. 1. In an object virtualization environment, virtual storage may be named, managed, and made accessible using any desired base object as implemented by virtual object device server 1130, such as a file object or a database table object. Thus, in one embodiment, an object device client 1120 may be presented with a virtual object device 1155 consisting of a collection of named files, and may perform file-based operations (such as reads from a file, writes to a file, increasing the size of a file, truncating a file, etc.) directly on virtual object device 1155. Object-based virtualization may thus allow the offloading of functionality traditionally performed at a host computer system (such as the translation of a file name and offset within a file to a block device address) to a storage device such as an object storage device or OSD (e.g., devices 1150A and 1150B in FIG. 11) that may be optimized to perform the needed storage operations, freeing up resources at the host computers. In addition, once virtual objects have been created and configured, a virtual object device server 1130 may distribute metadata on the virtual object storage device 1155 to virtual device clients 1120, allowing virtual device clients 1120 to perform input/output (I/O) operations on the virtual objects without further interaction with the virtual object device server. In some embodiments, a virtual object device 1155 may be mirrored, or may be otherwise organized in a manner that requires a single logical update to result in two or more physical write operations at different object storage devices. For example, an object device server may manage a file or other object using two or more redundant copies at different OSDs, or add other functions (such as parity) requiring multiple physical updates for each logical update. Object storage devices 1150 may provide write forwarding functionality similar to that described above for storage servers 140 in block virtualization environments (e.g., if an update requested on an object requires physical write operations at two OSDs, a first OSD 1150A may start the first physical write operation, and may forward a request for the second write operation to OSD 1150B). Each OSD 1150 may include a corresponding OSD processor 1110 and an OSD RAM 1120. In the embodiment illustrated, OSD 1150A includes a collection of physical disks 110A-C, and OSD 1150B includes physical disks 110D-E.

It is noted that various combinations of the different virtualization techniques described above may be employed within different embodiments of system 100. For example, in one embodiment, a single storage environment may employ host-based volume managers, virtualization switches, object storage devices, and other virtualization mechanisms, one or more of which may utilize the write forwarding techniques described above.

In general, a storage server 140 may be any device capable of providing access to physical storage devices 110 to virtual device clients 120 and virtual device servers 130, and supporting the write forwarding functionality described above. For example, as described earlier, in one embodiment, a storage server 140 may be a computer system with a processor, one or more memories, one or more network interface cards, one or more disk arrays and/or individual disk devices. In another embodiment, a storage server 140 and physical storage devices 110 managed by storage server 140 may be in distinct physical enclosures and may be connected by one or more network links. Numerous other configurations of storage servers 140 are possible and contemplated.

Figure 12:
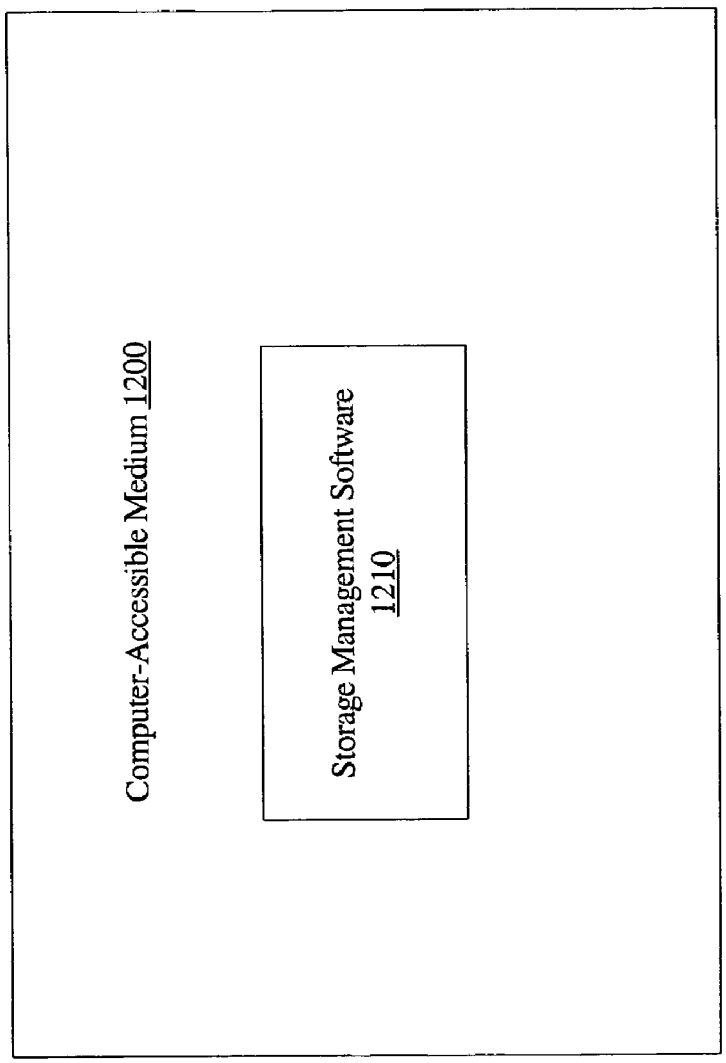
FIG. 12 is a block diagram illustrating a computer-accessible medium.

FIG. 12 shows one embodiment of a computer-accessible medium 1200 comprising storage management software instructions 1210, which, when executed, accomplish the functionality of volume servers 130, volume clients 120, and storage servers 140 as described above. Generally speaking, the computer-accessible medium may include storage media such as magnetic or optical media such as RAM (e.g., SDRAM, RDRAM, SRAM, etc.), ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    a first and a second physical storage device;
    a first and a second storage server;
    a virtual device server; and
    a virtual device client;
    wherein the virtual device server is configured to:
        aggregate storage in the first and second physical storage devices into a virtual device, wherein an update to the virtual device requires a first write operation at the first physical storage device and a second write operation at the second physical storage device; and
        make the virtual device accessible to the virtual device client;
    wherein the virtual device client is configured to send a request for the update to the first storage server; and
    wherein, in response to the request for the update, the first storage server is further configured to:
    start the first write operation, and
    send a request for the second write operation to the second storage server.

2. The system as recited in claim 1, wherein the second storage server is configured to:
    perform the second write operation in response to the request for the second write operation, and
    send a message indicative of a completion of the second write operation to the first storage server; and
    wherein the first storage server is further configured to:
        complete the first write operation; and
        send a message indicative of a completion of the update to the virtual device client after a completion of the first write operation and a reception of the message indicative of the completion of the second write operation.

3. The system as recited in claim 1, wherein the virtual device is a block virtual device.

4. The system as recited in claim 1, wherein the virtual device is an object virtual device.

5. The system as recited in claim 1, wherein the virtual device is a mirrored logical volume.

6. The system as recited in claim 1, further comprising a third physical storage device, wherein the virtual device server is further configured to aggregate storage within the third physical storage device with storage in the first and second physical devices into the virtual device, wherein the virtual device is a distributed virtual RAID device.

7. The system as recited in claim 6, wherein the first and second storage servers are further configured to cooperatively calculate parity information corresponding to the update request after a message indicative of a completion of the update request has been sent to the virtual device client.

8. The system as recited in claim 1, wherein each of the first and second physical storage devices includes a write cache.

9. The system as recited in claim 1, further comprising one or more additional virtual device clients,
wherein the virtual device server is further configured to make the virtual device accessible to each of the one or more additional virtual device clients;
wherein each of the one or more additional virtual device clients is configured to send a request for an additional update to the first storage server; and
wherein the first storage server is further configured to arrange physical write operations corresponding to concurrent overlapping update requests in an order that preserves data consistency.

10. The system as recited in claim 9, wherein the virtual device server is further configured to send a request for an additional update to the first storage server.

11. The system as recited in claim 9, wherein the second storage server is further configured to send a request for an additional update to the first storage server.

12. The system as recited in claim 1, wherein the virtual device server is further configured to:
partition a virtual address space of the virtual device into a first address partition and a second address partition;
designate the first storage server as a first update coordinator for the first address partition and the second storage server as a second update coordinator for the second address partition; and
provide a mapping between the virtual address space and the first and second update coordinators to the virtual device client;
wherein the virtual device client is further configured to:
select a target update coordinator from the first and second update coordinators for the update using the mapping; and
send a request for the update to the target update coordinator; and
wherein in response to the request for the update, the target update coordinator is configured to:
perform a write operation at a local physical storage device, and
send a request for a remote write operation to an other update coordinator.

13. The system as recited in claim 12, wherein the virtual device server is further configured to provide the mapping to the virtual device client using an access token.

14. A method comprising:
aggregating storage in a first and a second physical storage device into a virtual device, wherein an update to the virtual device requires a first write operation at the first physical storage device and a second write operation at the second physical storage device;
making the virtual device accessible to a virtual device client;
sending a request for the update to a first storage server from the virtual device client; and
responding to the request for the update by:
starting the first write operation at the first storage server, and
sending a request for the second write operation to a second storage server from the first storage server.

15. The method as recited in claim 14, further comprising:
performing the second write operation at the second storage server in response to the request for the second write operation;
sending a message indicative of a completion of the second write operation from the second storage server to the first storage server;
completing the first write operation at the first storage server; and
sending a message indicative of a completion of the update to the virtual device client after a completion of the first write operation and a reception by the first storage server of the message indicative of the completion of the second write operation.

16. The method as recited in claim 14, wherein the virtual device is a block virtual device.

17. The method as recited in claim 14, wherein the virtual device is an object virtual device.

18. The method as recited in claim 14, wherein the virtual device is a mirrored logical volume.

19. The method as recited in claim 14, wherein the virtual device server is configured to aggregate storage within a third physical storage device with storage in the first and second physical devices into the virtual device, wherein the virtual device is a distributed virtual RAID device.

20. The method as recited in claim 14, further comprising:
making the virtual device accessible to each of one or more additional virtual device clients;
sending a request for an additional update from each of the one or more additional virtual device clients to the first storage server; and
the first storage server arranging physical write operations corresponding to concurrent overlapping update requests in an order to preserve data consistency.

21. The method as recited in claim 14, further comprising:
partitioning a virtual address space of the virtual device into a first address partition and a second address partition;
designating the first storage server as a first update coordinator for the first address partition and the second storage server as a second update coordinator for the second address partition;
providing a mapping between the virtual address space and the first and second update coordinators to the virtual device client;
selecting a target update coordinator from the first and second update coordinators for the update using the mapping;
sending a request for the update to the target update coordinator from the virtual device client; and
responding to the request for the update at the target update coordinator by:
performing a write operation at a local physical storage device, and
sending a request for a remote write operation to an other update coordinator.

22. A computer-readable memory medium which stores program instructions, wherein the program instructions are executable by a processor to:
- aggregate storage in a first and second physical storage device into a virtual device, wherein an update to the virtual device requires a first write operation at the first physical storage device and a second write operation at the second physical storage device;
- make the virtual device accessible to a virtual device client;
- send a request for the update to a first storage server from the virtual device client;
- start the first write operation at the first storage server in response to the request for the update, and
- send a request for the second write operation to the second storage server from the first storage server.

23. The computer-readable memory medium as recited in claim 22, further comprising program instructions executable by the processor to:
- perform the second write operation at the second storage server in response to the request for the second write operation;
- send a message indicative of a completion of the second write operation from the second storage server to the first storage server;
- complete the first write operation at the first storage server; and
- send a message indicative of a completion of the update to the virtual device client after a completion of the first write operation and a reception by the first storage server of the message indicative of the completion of the second write operation.

24. The computer readable memory medium as recited in claim 22, wherein the virtual device is a block virtual device.

25. The computer readable memory medium as recited in claim 22, wherein the virtual device is an object virtual device.

26. The computer readable memory medium as recited in claim 22, further comprising program instructions executable by the processor to:
- make the virtual device accessible to each of one or more additional virtual device clients;
- send a request for an additional update from each of the one or more additional virtual device clients to the first storage server; and
- arrange physical write operations corresponding to concurrent overlapping update requests at the first storage server in an order to preserve data consistency.

27. The computer readable memory medium as recited in claim 22, further comprising program instructions executable by the processor to:
- partition a virtual address space of the virtual device into a first address partition and a second address partition;
- designate the first storage server as a first update coordinator for the first address partition and the second storage server as a second update coordinator for the second address partition;
- provide a mapping between the virtual address space and the first and second update coordinators to the virtual device client;
- select a target update coordinator from the first and second update coordinators for the update using the mapping;
- send a request for the update to the target update coordinator from the virtual device client; and
- respond to the request for the update at the target update coordinator by:
  - performing a write operation at a local physical storage device, and
  - sending a request for a remote write operation to another update coordinator.

* * * * *